United States Patent
Wortman

(10) Patent No.: US 10,831,689 B2
(45) Date of Patent: Nov. 10, 2020

(54) TIME-DIVISION-MULTIPLEXING OF DIFFERENT PROTOCOLS OVER A CHANNEL OF AN INTERFACE BUS BETWEEN DIE

(71) Applicant: Intel Corporation, Santa Clara, CA (US)

(72) Inventor: Curtis Stephen Wortman, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/176,900

(22) Filed: Oct. 31, 2018

(65) Prior Publication Data

US 2019/0065427 A1 Feb. 28, 2019

(51) Int. Cl.
*G06F 13/40* (2006.01)
*H04J 3/02* (2006.01)
*H04L 12/46* (2006.01)

(52) U.S. Cl.
CPC ............ *G06F 13/4027* (2013.01); *H04J 3/02* (2013.01); *H04L 12/4625* (2013.01); *G06F 2213/0026* (2013.01)

(58) Field of Classification Search
CPC .................................................... H04W 84/12
See application file for complete search history.

(56) References Cited

U.S. PATENT DOCUMENTS 6,757,244 B1 *   6/2004   Redman .............. H04L 12/2801
                                                       370/227
9,479,279 B2 * 10/2016   Gilbert ..................... H04J 3/16

* cited by examiner

*Primary Examiner* — Henry Tsai
*Assistant Examiner* — Juanito Borromeo
(74) *Attorney, Agent, or Firm* — Fletcher Yoder PC

(57) ABSTRACT

Methods and systems that uses time-division multiplexing to send two or more protocols over an interconnect bridge between two die. The two die communicate, using the interconnect bridge, using a first protocol and a second protocol. The first protocol is a down-configured version of a high-bandwidth version passable through the interconnect bridge. Additional data is interleaved over the interconnect bridge. The additional data is received at a first die of the two die using a second protocol, and the first die interleaves the additional data into communications between the first and second die using time-division multiplexing.

21 Claims, 8 Drawing Sheets

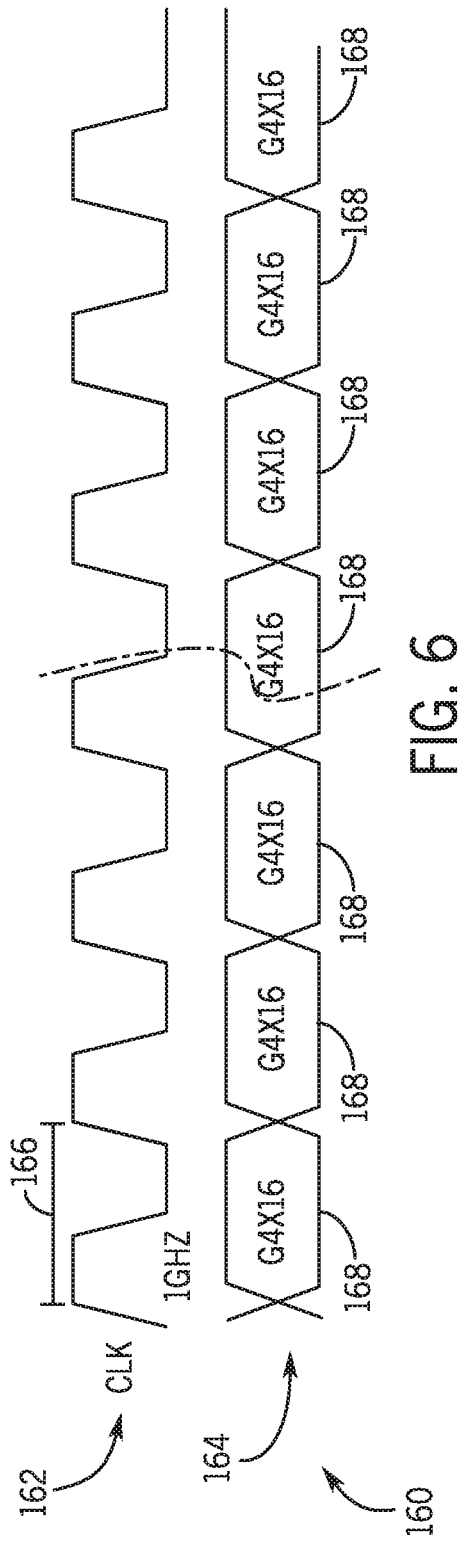
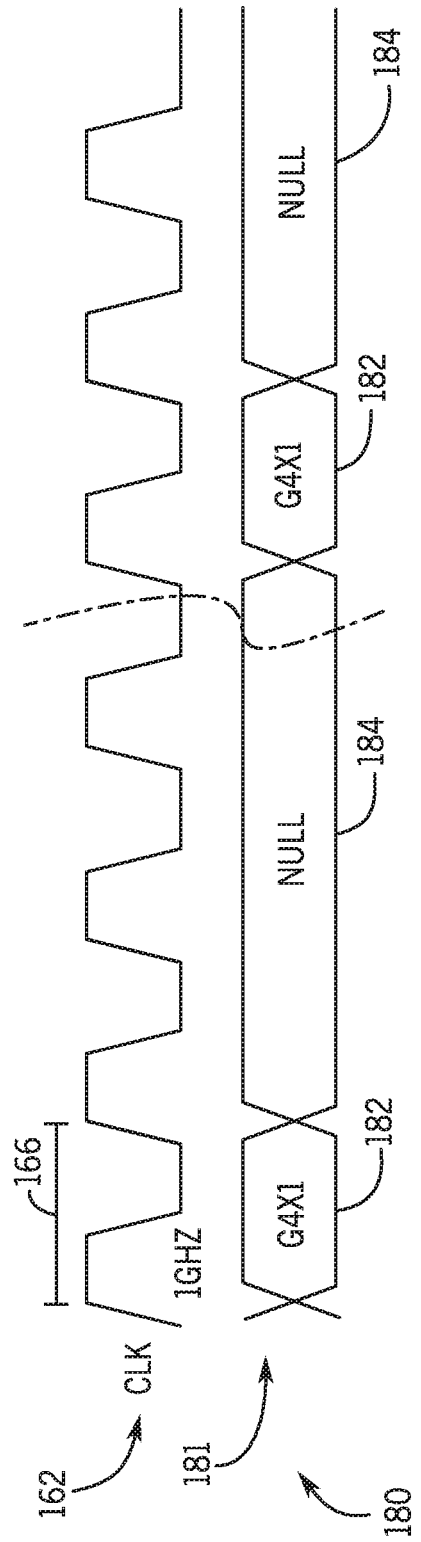

TIME-DIVISION-MULTIPLEXING OF DIFFERENT PROTOCOLS OVER A CHANNEL OF AN INTERFACE BUS BETWEEN DIE

BACKGROUND

This disclosure relates to an interface bridge between two separate integrated circuit die that may include one or more channels that alternate between different protocols using time-division multiplexing (TDM).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuit devices are used in numerous electronic systems. Computers, handheld devices, portable phones, televisions, industrial control systems, robotics, and telecommunication networking—to name just a few—all use integrated circuit devices. Integrated circuit devices may be formed using lithography techniques that pattern circuitry onto a substrate wafer that is diced to form a number of (generally identical) individual integrated circuit die. Each integrated circuit die may include many different components, such as programmable logic fabric, digital or analog signal transmission circuitry, digital signal processing circuitry, application-specific data processing circuitry, memory, and so forth. In general, different components may be based on different underlying technologies. Thus, different components of an integrated circuit device may be better suited to different development cycles or fabrication techniques. For example, programmable logic fabric such as field programmable gate array (FPGA) fabric may scale well to smaller sizes and thus may benefit greatly by using newer lithography techniques. On the other hand, other technologies, such as certain analog signal transmission circuitry, may not scale as well and may be better suited to older fabrication techniques.

To enable different components of an integrated circuit device to be developed more independently, some of the components may be moved off-chip. Instead of a single monolithic design, a first integrated circuit die with some of the components may be fabricated separately from a second integrated circuit die with other components. As such, the various separate integrated circuit die may be fabricated using different lithography techniques or generations, and may be developed according to different schedules. Yet separating the components onto separate die may come at a cost. Namely, it may be difficult or impossible to use the same number of wires between the separate first integrated circuit die and the second integrated circuit die as may be found in a monolithic interface.

Some programmable devices may interface with a variety of devices that may be configured to use higher or lower bandwidth communication interfaces. The programmable devices may have configurable IO that may be programmed to function as different protocols each with corresponding bandwidth limitations defined in their specifications to match application usage. However, the lower bandwidth communication interfaces may still block a number of interface channels/wires even when consuming less bandwidth thereby reducing efficiency of communications of the interface channels/wires thereby causing a decrease in efficiency and/or an increase in a number of chiplets and channels used to communicate.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A seemingly monolithic interface may be provided between separate integrated circuit die. Systems and methods for providing an interface bridge between two integrated circuit die are provided. In particular, in at least some examples, one of the integrated circuit die may include a programmable logic fabric, such as FPGA fabric. The interface bridge may provide efficient, compact interconnection between the transceiver die and the programmable logic fabric of the PLD die. However, implementations over the interface bridge may consume less wires than available or may throttle a data rate between die if the protocol is less than the upper physical limit of the interconnect. To alleviate a low-rate protocol from consuming more wires (and corresponding bandwidth) of the interconnect bridge than corresponding to its bandwidth, the interface bridge may use time-division multiplexing (TDM) to alternate transmissions of data in different protocols over a channel of the interface bridge.

In other words, this disclosure relates to transceiver design for high-speed data links, and more specifically, to a flexible re-configurable transceiver design that may be employed with multiple different protocols to maximize the number of protocols and effective bandwidth across the channels. This increase is particularly useful when a transceiver has been implemented on a different die than a mother/programmable fabric die. Certain applications of programmable logic fabric utilize high bandwidth driving an increase in frequency of and demand for the serial data links of a various protocol types. The programmable logic device may support different numbers of links hosting different protocols running at different bandwidths and rates to facilitate connectivity with a variety of devices. The programmable logic devices may have different sizes to adapt to application needs which have an impact on power, resources, and cost.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 6 is a timing diagram illustrating full utilization of bandwidth of the interface bridge of FIG. 1 using a first protocol, in accordance with an embodiment;

FIG. 7 is a timing diagram illustrating a partial utilization of bandwidth of the interface bridge of FIG. 1 using a down-configured version of the first protocol of FIG. 6, in accordance with an embodiment;

DETAILED DESCRIPTION OF SPECIFIC EMBODIMENTS

Figure 1:
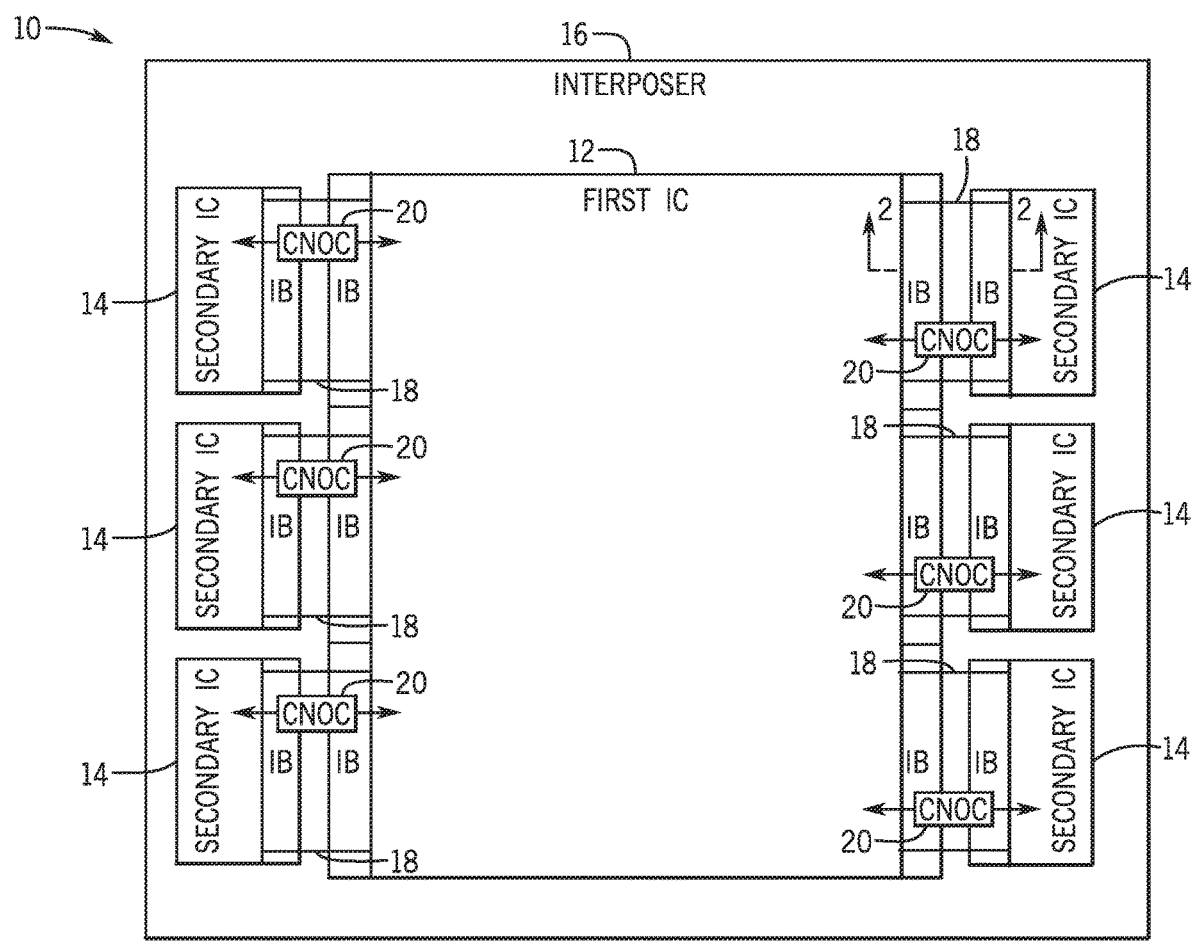
FIG. 1 is a schematic block diagram of a multi-die integrated circuit system that uses an interface bridge, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

A multi-chip system may be represented as a 3D or 2.5D system of separate integrated circuit die that communicate signals between each other in an efficient manner. A 3D interconnection involves stacking integrated circuit die on top of each other, while a 2.5D interconnection involves connecting integrated circuit die through some form of bridge, such as a silicon interposer, a bridge structure disposed in a substrate (e.g., an Embedded Multi-die Interconnect Bridge (EMIB) by Intel Corporation), or a direct connection from one die to the other. In either a 3D or 2.5D arrangement, the number of connections available between the die may be fewer than would be available if the multiple die were instead part of a single monolithic integrated circuit die. Yet there are many reasons to separate the integrated circuit die. In particular, some technologies, such as analog technologies used in high-speed transceivers, may not scale as easily to newer lithography techniques as other circuitry, such as programmable fabric of a programmable logic device (PLD), such as a field programmable gate array (FPGA) fabric. When different die are separated, however, the once-monolithic communication between them may be replaced with an efficient interface bridge communication system, such as the systems described in this disclosure.

Efficient communication between integrated circuit die may be obtained between different integrated circuit die that are separate, rather than part of a single, monolithic integrated circuit device. In some cases, it may be desirable to maintain communication between the integrated circuit die as if they were connected in a monolithic solution. That is, from the perspective of each separate integrated circuit die, it may be advantageous to appear to be monolithically connected in one larger integrated circuit die.

In a particular example involving a programmable logic device (PLD) fabric, such as an FPGA fabric, there may be a potentially wide variety of secondary integrated circuit die that may be connected to a first, main FPGA integrated circuit die. These secondary integrated circuit die may include a transceiver and digital processing circuitry, a central processing unit (CPU) subsystem, parallel input/output (I/O) off loading, digital signal processing (DSP) arrays, and the like. In addition, the programmable logic fabric may be capable of being configured using a set of programming instructions (a configuration bitstream) received from an external source, such as a network or memory device. Thus, the interface bridge of this disclosure may appear to operate from the perspective of the user in the same way as previously available monolithic solutions.

With this in mind, systems and methods for providing an interface bridge between two integrated circuit die are provided. In particular, in at least some examples, one of the integrated circuit die may include a programmable logic fabric, such as FPGA fabric. The interface bridge may provide efficient, compact interconnection between the transceiver die and the programmable logic fabric of the PLD die. The interface bridge may use time-division multiplexing (TDM) to alternate transmissions of data in different protocols over a channel of the interface bridge. Additionally, in some embodiments, the interface bridge may use a source-synchronous connection to eliminate problems of synchronous crossing across the interface bridge, using adaptive logic in the base die to make return signals appear to be synchronous. Moreover, the interface bridge may operate as a layered protocol. That is, the interface bridge may use a hardened physical input/output (I/O) layer that operates under the control of a higher-level protocol layer that may be formed from hardened or soft logic. As mentioned above, the interface bridge may enable a variety of different integrated circuit die to be interconnected, such as a transceiver suitable for utilizing various transmission protocols. The interface bridge may also enable connection of other integrated circuit die including circuitry for digital protocol processing, a CPU subsystem, parallel I/O off loading, and/or other data processing offloading, such as DSP arrays or graphics processing unit (GPU) processors.

This disclosure relates to transceiver design for high-speed data links, and more specifically, to a flexible reconfigurable transceiver design that may be employed with multiple different protocols to maximize the number of protocols and effective bandwidth across the channels. This increase is particularly useful when a transceiver has been implemented on a different die than a mother/programmable fabric die. Certain applications of programmable logic fabric utilize high bandwidth driving an increase in frequency of and demand for the serial data links. For example, a data center may include data processing servers and data storage servers that has Peripheral Component Interconnect Express (PCIe) protocol connectivity to a device supporting Ethernet networking. Ethernet spans from low data rates of 10 Mbps to 400 Gbps and use different transceiver technology than what may be found on servers for PCIe at 16 Gbps. There are also applications that use low bandwidth connections with serial links running below 1 Gbps supporting legacy or control plane interfaces.

The programmable logic device may support different protocols running at different bandwidths and rates to facilitate connectivity with a variety of devices. The programmable logic devices may have different sizes to adapt to application needs which have an impact on power, resources, and cost With this in mind, FIG. 1 is a block diagram of an example integrated circuit (IC) system 10 that may include a package that includes a first integrated circuit (IC) die 12 connected to any suitable number of secondary integrated circuit (IC) die 14. The first IC die 12 and the secondary IC die 14 may be connected through any suitable conductive bridge, such as a silicon bridge 16 or a bridge structure disposed in a substrate (e.g., an Embedded Multi-die Interconnect Bridge (EMIB) by Intel Corporation) or a direct connection between the first IC die 12 and the secondary IC die 14. The first IC die 12 and the secondary IC die 14 may be any suitable integrated circuit devices. In one example, the first IC die 12 is an integrated circuit device that includes a programmable logic fabric and the secondary IC die 14 are high-speed transceivers with protocol processing digital logic. The IC system 10 may benefit from the separateness of the first IC die 12 and secondary IC die 14 because the underlying technologies of these die may be different. As such, they may be developed in a more modularized way that is appropriate to the technology of each die.

While the examples provided below may refer to the first IC die 12 as a programmable logic device and refer to the secondary IC die 14 as high-speed transceivers, other types of integrated circuit devices may benefit from this disclosure. These may include digital processing circuitry, a central processing unit (CPU) subsystem, parallel input/output (I/O) off loading, digital signal processing (DSP) arrays, and the like.

The first IC die 12 may connect to the secondary IC die 14 through physical chip-to-chip interconnects of the silicon bridge 16 via a logical interface bridge (TB) 18 that controls the way signals are sent and received. That is, as used herein, the IB 18 represents a logical connection between the first IC die 12 and the secondary IC die 14. The IB 18 handles signal transfer between physical chip-to-chip interconnects of the silicon bridge 16.

The IB 18 may allow a configuration network on chip (CNOC) 20 interface to extend between the first IC die 12 to the secondary IC die 14. The CNOC 20 allows configuration signals from the secondary IC die 14 to enter the first IC die 12 to be used to program programmable logic fabric of the first IC die 12. Even so, it should be understood that other types of integrated circuit die may be used that use other aspects of the IB 18, but which do not provide the CNOC 20 because the first IC die 12 may not include the programmable logic fabric in all embodiments. Still, the IB 18 may be particularly useful when the first IC die 12 contains a programmable logic fabric, such as FPGA fabric. Indeed, the IB 18 may be used to transfer data in addition to or alternative to configuration signals.

Figure 2:
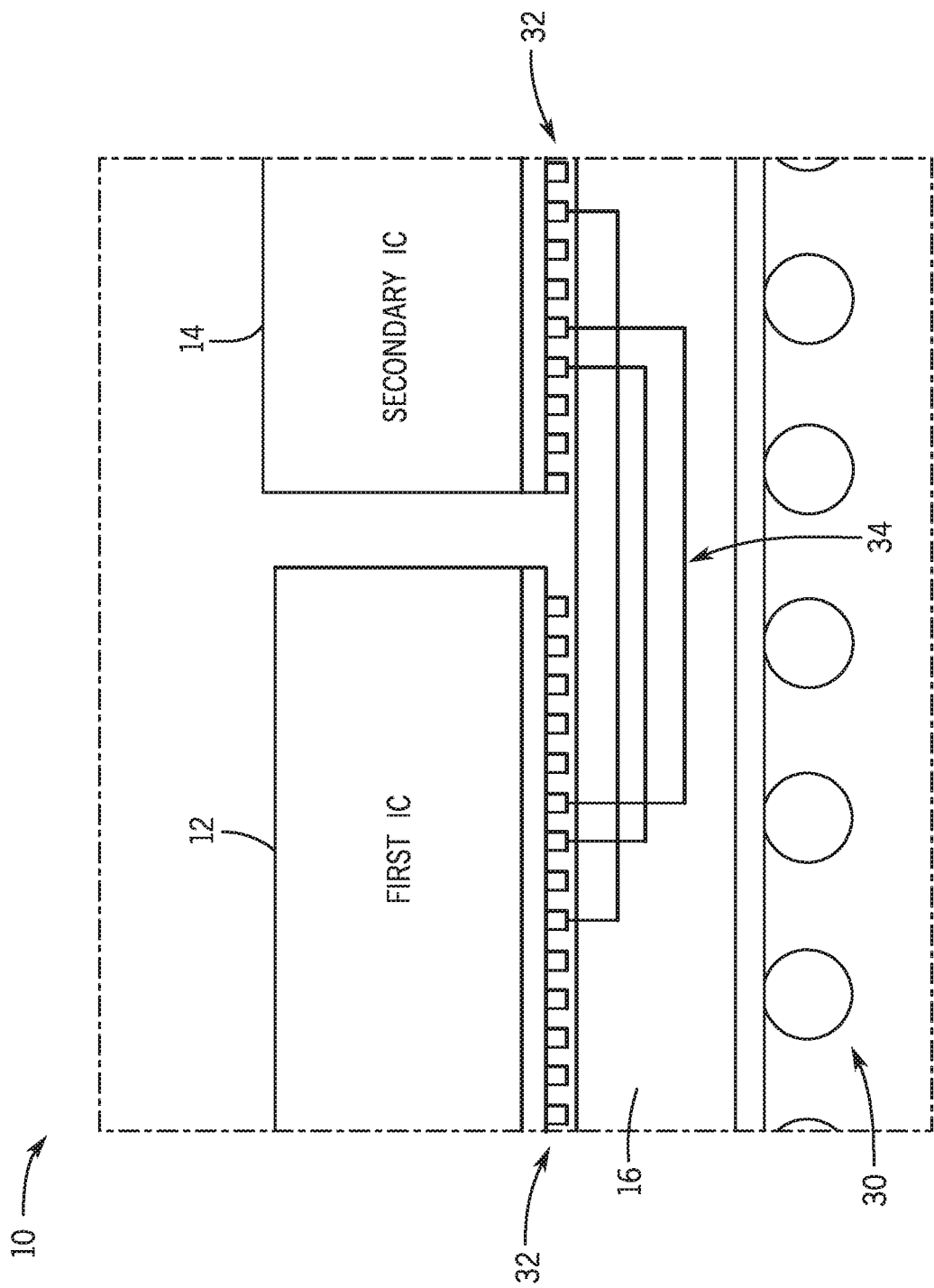
FIG. 2 is a schematic cross-sectional view of a portion of the integrated circuit device system of FIG. 1, in accordance with an embodiment.

FIG. 2 shows a schematic cross-sectional view of the IC system 10 along cut lines 2-2 of FIG. 1. As may be seen in FIG. 2, the silicon bridge 16 may be an interposer (as shown) or may be any other suitable silicon bridge (e.g., an interconnect bridge such as an Embedded Multi-die Interconnect Bridge (EMIB) by Intel Corporation) disposed on a substrate. In other examples, the first IC die 12 and the secondary IC die 14 may be directly connected to one another through a form of stacking. In the example shown in FIG. 2, the silicon bridge 16 represents an interposer that uses a ball grid array (BGA) of solder balls 30, which may electrically connect to other circuitry, such as a printed circuit board (PCB) (not shown). The physical interconnection between the first IC die 12 and the secondary IC die 14 occurs through corresponding respective interconnect points 32 (here, taking the form of microbumps), which couple to each other through chip-to-chip interconnects 34 within the silicon bridge 16.

It should be understood that FIG. 2 represents a 2.5D arrangement that uses a silicon bridge 16 to connect the first IC die 12 and the secondary IC die 14. In other embodiments, the first IC die 12 and the secondary IC die 14 may be connected in a 3D arrangement, in which case the interconnect points 32 may directly connect to the other IC. For instance, the secondary IC die 14 may be stacked on top of the first IC die 12 and the interconnect points 32 may directly connect to corresponding interconnect structures on the first IC die 12. For example, the direct connection may include the first IC die 12 with interconnect points 32 extending down and the secondary IC die 14 inverted with interconnect points 32 extending upward to directly connect the interconnect points 32 between the first IC die 12 and the secondary IC die 14. Alternatively, the interconnect points 32 may be coupled together using a via through at least a portion of the substrate.

In either a 2.5D or 3D arrangement, the first IC die 12 and the secondary IC die 14 may communicate through a relatively limited number of physical connections in relation to the number of connections that might be possible in a monolithic interface (i.e., if the first IC die 12 and the secondary IC die 14 were patterned onto a single monolithic integrated circuit die). To account for the limited number of physical connections between the first IC die 12 and the secondary IC die 14, the IB 18 may efficiently communicate a variety of types of signals over the limited number of connections.

Figure 3:
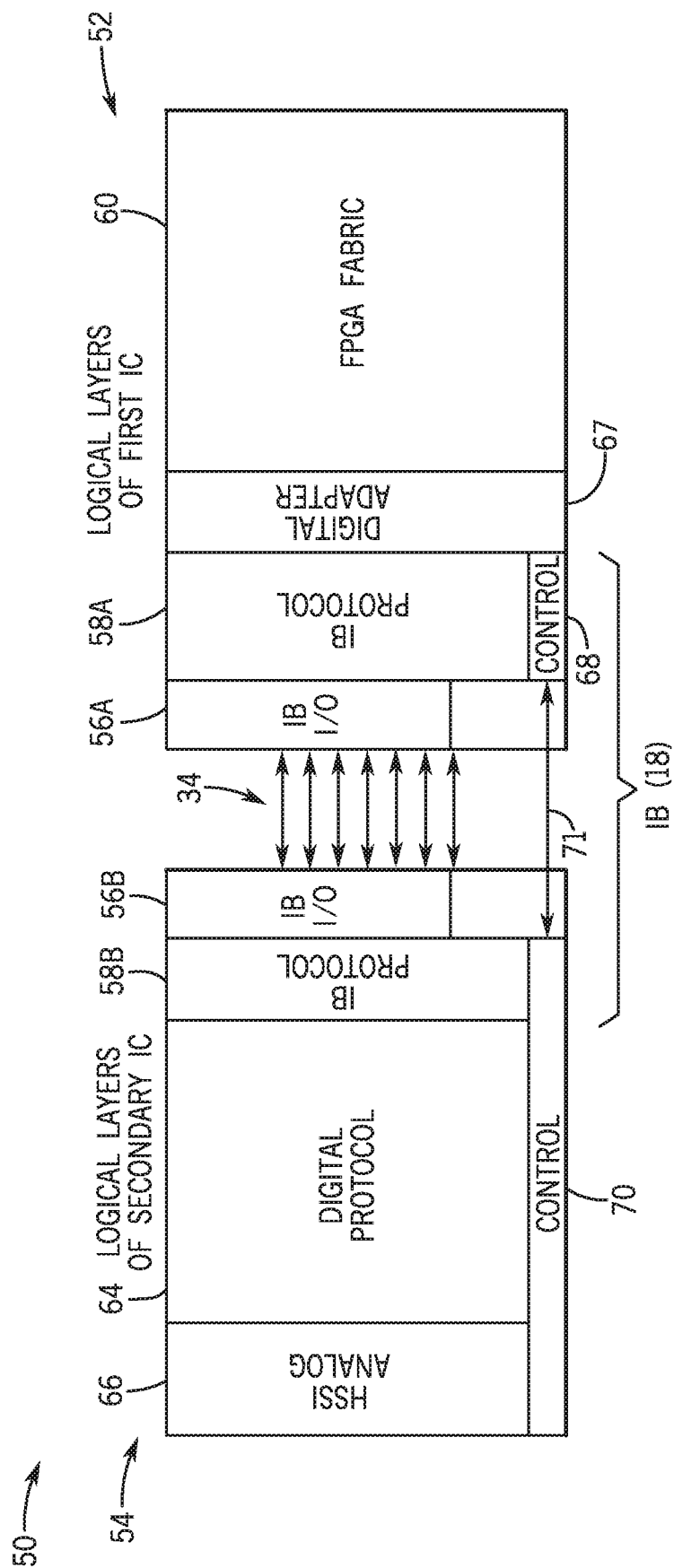
FIG. 3 is a block diagram illustrating logical layers of the circuitry of the integrated circuit device system of FIG. 1, in accordance with an embodiment.

In support of this, the IB 18 may be logically divided into several logical layers, as shown by a layer diagram 50 of FIG. 3. In particular, the layer diagram 50 shows different logical layers 52 of the first IC die 12 and logical layers 54 of the secondary IC die 14 when the secondary IC die 14. The particular example of FIG. 3 illustrates logical layers that may be present when the secondary IC die 14 includes high speed serial interface (HSSI) transceiver circuitry and the first IC die 12 includes field programmable gate array (FPGA) fabric. The IB 18 may be understood logically as formed by a physical input/output (I/O) layer 56A and a higher-level IB protocol layer 58A on the first IC die 12, and a corresponding physical I/O layer 56B and higher-level IB protocol layer 58B on the side of the secondary IC die 14. The physical I/O layers 56A and 56B are physically connected to one another via the chip-to-chip interconnects 34.

The IB I/O layers 56A and 56B represent physical layers that transmit signals to, or receive signals from, a corresponding interconnect point over the chip-to-chip interconnects 34. The physical IB I/O layers 56A thus may include circuitry to drive signals over the chip-to-chip interconnects 34 and/or receive signals from the chip-to-chip interconnects 34. Generally speaking, the physical IB/O layers 56A and 56B may be implemented through hardened logic circuitry. In some embodiments, however, the physical I/O layers 56A and/or 56B may be at least partially formed through programmable fabric that has been configured to operate as the physical IB I/O layer.

The higher-level IB protocol layers 58A and 58B represent logical layers that operate on top of the physical operation of the physical IB I/O layers 56A and 56B, respectively, to make the communication that takes place over the IB 18 as seamless as possible. That is, when higher-level communication interacts with the IB 18, the higher-level communication may not "see" the operation of the IB protocol layers 58A and 58B or the physical signal transmissions that occur in the physical IB I/O layers 56A and 56B. The IB 18 may appear to be invisible (e.g., a "black box") from the perspective of higher-level layers.

Some of the higher-level logical layers may include, on the first IC die 12, an FPGA fabric 60. The FPGA fabric 60 may communicate any suitable logical controls over the IB 18 as if the FPGA fabric 60 were monolithically connected to the secondary IC die 14. For instance, the FPGA fabric 60 may operate using asynchronous status or control signals that may be received from the secondary IC die 14 via a source-synchronous connection over the IB 18.

The secondary IC die 14 may also include higher-level logical layers such as a digital protocol layer 64 and/or an HSSI analog layer 66. These may be understood to represent various functions or operations that the secondary IC die 14 may be capable of performing. In the particular example of FIG. 3, these functions represent operational capabilities of an HSSI transceiver. However, other functions may take the place of these logical layers when the secondary IC die 14 includes other circuitry, such as memory circuitry. For example, when the secondary IC die 14 includes memory, the other logical layers beyond the IB 18 layers 56B and 58B may include random access memory (RAM) functions. When the secondary IC die 14 includes a central processing unit (CPU), the higher-level logical layers may include CPU data-processing functions.

The chip-to-chip interconnects 34 may be used to stream data between the layers 56A and 56B as streaming data between the first IC die 12 and the secondary IC die 14 through the IB 18 as a conduit between the first IC die 12 and the secondary IC die 14 through the IB 18. Simplistically, the IB 18 may be considered as a bunch of wires with a FIFO assisting in crossing clock domains between the between the first IC die 12 and the secondary IC die 14. Higher-level protocols, such as Peripheral Component Interconnect Express (PCIe) or Ethernet, may be mapped to the IB 18 via the digital protocol layer 64. Additionally, a digital adapter layer 67 may be used to interpret the data transferred via the IB 18.

As the layer diagram 50 indicates, control layers 68 and 70 may be used to pass control and status messages 71 between the first IC die 12 and the secondary IC die 14 through the IB 18. Additionally, the control layers 68 and/or 70 may be split into digital and analog control layers that each control respective analog layers (e.g., HSSI analog layer 66) and digital layers (e.g., digital protocol layer 64).

As noted above, two separate integrated circuit die may have separate circuit components. In prior monolithic designs where these separate components were combined in a single integrated circuit, these components would have communicated through internal monolithic interfaces between the components. In some cases, these monolithic interfaces may communicate asynchronous signals that cross clock domains between the first IC die 12 and the secondary IC die 14 through the IB 18. When the separate components of the integrated circuit die are separated onto two different integrated circuit die, such as the first IC die 12 and the secondary IC die 14, it may be useful to maintain the same type of monolithic-style communication despite the separation of the first IC die 12 and the secondary IC die 14. This may provide a well-known and consistent look-and-feel of the communication between the circuitry of the integrated circuit of the first IC die 12 and the secondary IC die 14. That is, from the perspective of the first IC die 12, the circuitry of the secondary IC die 14 may appear to be accessible through an asynchronous monolithic interface, even though the actual communication between them may be synchronous and/or serial. Likewise, from the perspective of the secondary IC die 14, the circuitry of the first IC die 12 may appear to be accessible through the familiar asynchronous monolithic interface, even though the actual communication between them may be synchronous and/or serial.

Figure 4:
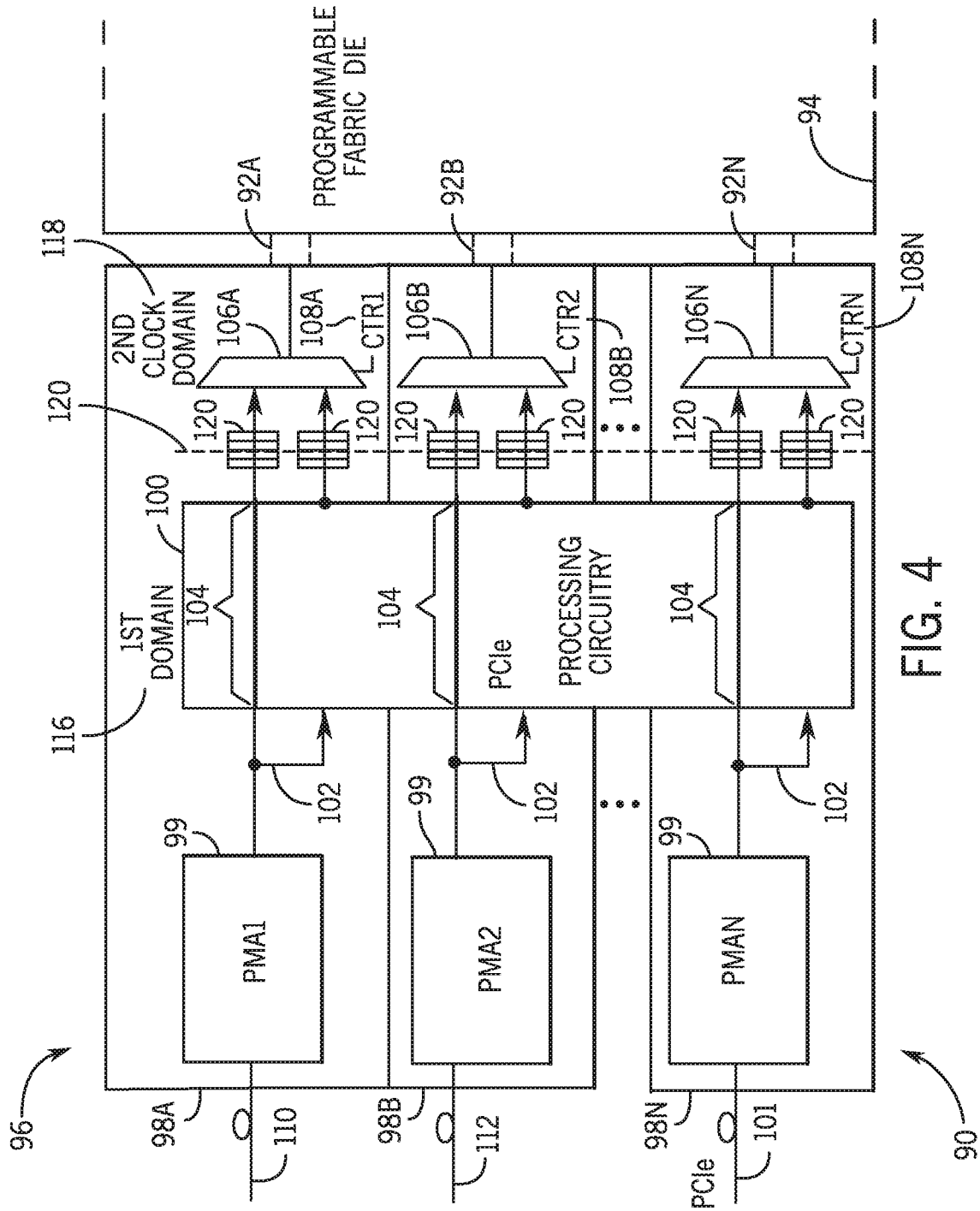
FIG. 4 is a block diagram of a first portion of the multi-die integrated circuit system of FIG. 1 configurable to transport data in various protocols across the interface bridge of FIG. 1, in accordance with an embodiment.

FIG. 4 illustrates a simplified block diagram of a first portion of a system 90 that includes a number of channels 92 (e.g., wires) connecting a programmable fabric die 94 with a transceiver die 96 over the IB 18. The transceiver die 96 may include one or more channels 98 that receive data using a physical medium attachment (PMA) 99. For instance, the transceiver die 96 may include 24 transceiver channels 98 coupled to 24 channels 92. However, the IB 18 may have any suitable number of channels 92, and the transceiver die 96 may have any suitable number of channels 98. In some embodiments, the number of channels 92 may be equal to the number of channels 98. Alternatively, the number of channels 92 may be different than the number of channels 98. For instance, the IB 18 enable the programmable fabric die 94 to interface with multiple transceiver die 96 (or other die). In some embodiments, each channel 92 may provide an amount (e.g., 40 Gbps) of bandwidth. The bandwidth of the channels 98 may be a different amount (e.g., down 1 Gbps and up to 100 Gbps) and may consume one or more channels 92.

The system 90 includes processing circuitry 100 that may include hardened circuitry to decode and/or process a protocol (e.g., PCIe) data received by the transceiver die 96 to be transported to the programmable fabric die 94. Protocol decoding may increase consumption of IB 18 bandwidth by consuming more channels 92 than the raw data from the channels 98 would consume alone. This is true since the PCIe protocol is decompressed in the PCIe processing circuitry 100, and the subsequent signals over the channels 92 carry sideband control and status information thus expanding the number of channels 92 used to transmit the data (and sideband control and status information).

The programmable fabric die 94 may support data plane and control plane applications using the PCIe processing circuitry residing on the transceiver die 96. Communications over PCIe pin(s) 101 may include a high-bandwidth PCIe Gen4x16 (e.g., data plane) or may be down-configured to a low-bandwidth Gen4x1 (e.g., control plane). However, Gen4x16 and Gen4x1 may consume a same number of channels 92 between the transceiver die 96 and the programmable fabric die 94. The processing circuitry 100 may traditionally block unused transceiver channels 98 impacting efficiency of transfers to the programmable fabric die 94 via the channels 92. For example, a Gen4x16 interface will consume 16 channels 98 and 16 channels 92. A Gen4x1 interface will also consume 16 channels 92 but will only consume a single channel 98. Thus, unmodified, the Gen4x1 interface may provide less than $\frac{1}{16}^{th}$ or 6.25% of the bandwidth of Gen4x16 while consuming the same number of channels 92 of the IB 18.

As described below, to increase higher throughput channel efficiency in using a reduced-initial configured or down-configured interface may be achieved by splitting incoming data from the channels 98 into a PCIe path 102 and a bypass 104 that foregoes entry into the processing circuitry 100 to inject data from other protocols based on a difference in bandwidth consumption of the interface bridge 18. The difference in bandwidth consumption per channel is a difference between a high-bandwidth protocol (e.g., PCIe Gen4x16) maximum (e.g., 40 Gbps) and a low-bandwidth protocol (e.g., PCIe Gen4x1) maximum (e.g., 2.5 Gbps). For instance, the IB 18 may have 37.5 Gbps of unused bandwidth per channel due to a down-configuration of from PCIe Gen4x16 to PCIe Gen4x1. To achieve insertion of data from other protocols, the PCIe path 102 and the bypass 104 enable selective use of hardened circuitry or soft logic for each channel 98 using multiplexers 106 controlled using control signals 108. As discussed below, the control signals 108 may indicate starts of time slots of the various protocols to cause the multiplexers 106 to pass data through the respective channel 92 corresponding to the respective protocol thereby reducing wasting of bandwidth of the IB 18 due to the down-scaling of the PCIe interface (e.g., Gen4x16 from Gen4x1).

By utilizing the bypass 104, data may be pushed through channel(s) 92 of the IB 18 in periods of availability on the corresponding channel(s) 92 using time-division multiplexing (TDM) when PCIe data (e.g., sideband controls and status messages) is not being transmitted over the channel(s) 92 due to implementation of a down-configured PCIe interface (e.g., PCIe Gen4x1 rather than Gen4x16).

By utilizing TDM, an existing structure of the IB 18 may be leveraged by driving a clock frequency of the IB 18 to a higher frequency to create time slots. Time slots that are not used in the PCIe transmission due to low bandwidth consumption over one or more channels 92 (e.g., channels 92A or 92B) may be created as null time slots, as illustrated in FIGS. 6-9. During a null time slot, additional data transferred to the transceiver die 96. For instance, data from a first protocol (e.g., Ethernet or other suitable data communication protocol) may be received over first protocol pin(s) 110 and transmitted over the channel 92A during a time slot unused by the PCIe transfer. Additionally, data from a second protocol (e.g., Ethernet or other suitable data communication protocol) may be received over second protocol pin(s) 112 and transmitted over the channel 92B during a time slot unused by the PCIe transfer. This additional data may then be streamed across the IB 18 to the programmable fabric die 94.

In some embodiments, the transceiver die 96 may span clock domains. For instance, the transceiver die 96 may receive data from the pin(s) 101, 110, and 112 and/or process the data using a first clock (e.g., 500 MHz) in a first clock domain 116. However, the transceiver die 96 may transmit data over the IB 18 that uses a different clock (e.g., 1 GHz). Accordingly, the transceiver die 96 may utilize a second clock domain 118 using clock-domain-crossing FIFOs 120 at a boundary 122 between the first clock domain 116 and the second clock domain 118 to transfer data therebetween.

Furthermore, one or more of the PMAs 99 may have different clock domains and clock frequencies than each other. For example, a clock from PMA 110 may be running at 25.78125 Gbps for 25G Ethernet for an approximately 403 MHz clock domain while 16 Gbps for PCIe Gen4 on PMA 101 may use a 500 MHz clock. The common clock domain 118 may be running at 1 GHz. To recreate the datastream for Ethernet without any clock gaps, the 403 MHz clock may be forward across channel 92A to enable the programmable fabric die 94 via user logic to interpret the data from a corresponding FIFO buffer. To accomplish this clocking scheme, in some embodiments, each channel 92 may selectively provide the original lane clock to corresponding user logic in the programmable logic die 94.

Figure 5:
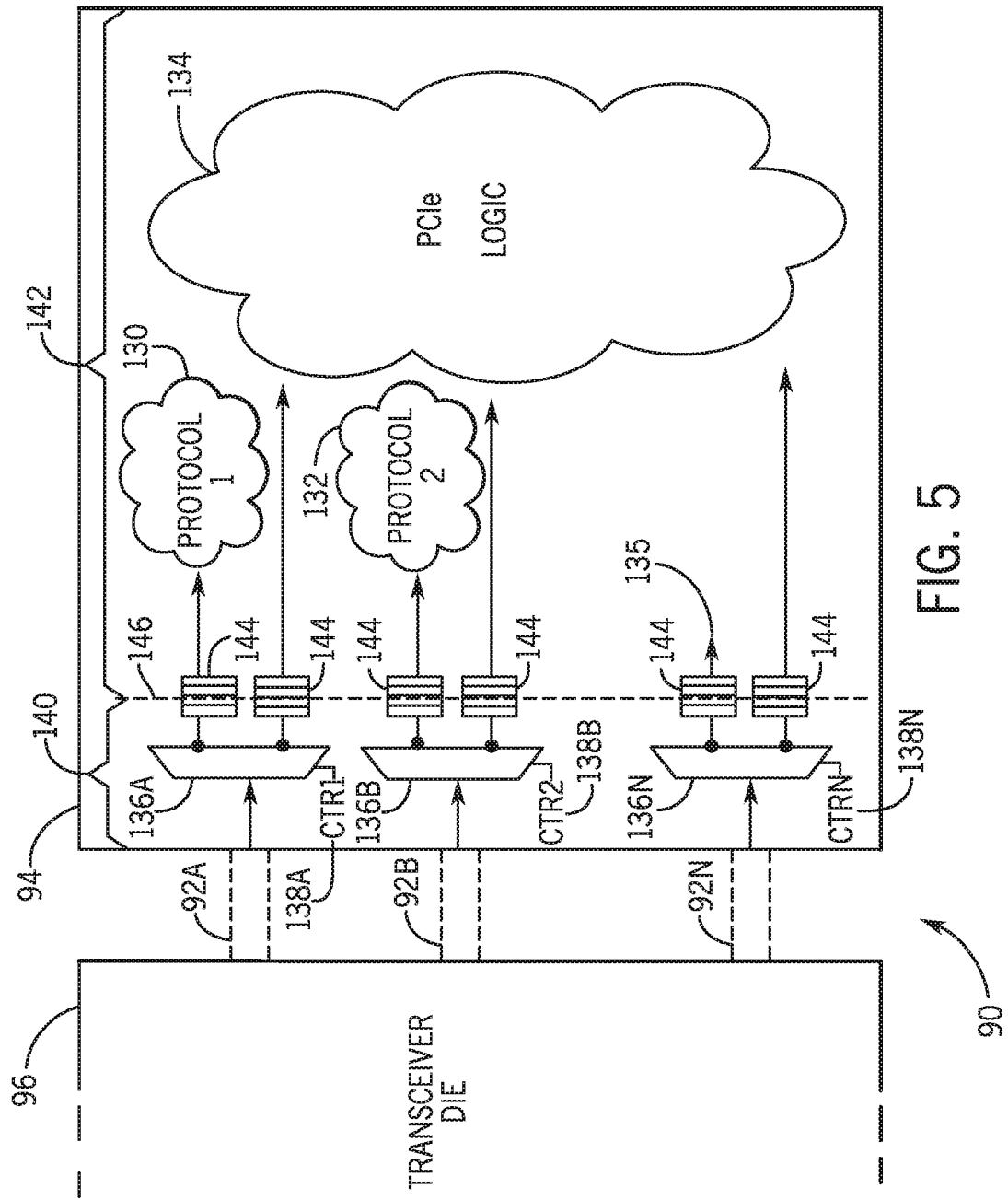
FIG. 5 is a block diagram of a second portion of the multi-die integrated circuit system of FIG. 1 configurable to transport data in various protocols across the interface bridge of FIG. 1, in accordance with an embodiment.

FIG. 5 illustrates a second portion of the IC system 10 showing details of the programmable fabric die 94. The programmable fabric die 94 includes a first protocol interpreter 130, a second protocol interpreter 132, and PCIe logic circuitry 134. Each of the first protocol interpreter 130, the second protocol interpreter 132, and the PCIe logic circuitry 134 may interpret the data according to the protocol over which the data is transferred. The first protocol interpreter 130, the second protocol interpreter 132, and the PCIe logic circuitry 134 may be implemented using hardware and/or software using the programmable fabric die 94.

As illustrated, the programmable fabric die 94 recomposes each protocol from transmissions over the channels 92 using demultiplexers 136 and delivers the corresponding protocols to the corresponding first protocol interpreter 130, the corresponding second protocol interpreter 132, or the PCIe logic circuitry 134 for interpretation and to cause actions (e.g., storage, reconfiguration of the programmable logic fabric, etc.) in the programmable fabric die 94. The demultiplexers 136 are controlled using control signals 138 that are used to pass data received from the IB 18 through the demultiplexer 136 to the appropriate target: the first protocol interpreter 130, the second protocol interpreter 132, or the PCIe logic circuitry 134. The control signals 138 may indicate a start of each time slot.

Similar to the transceiver die 96, the programmable fabric die 94 may span clock domains. For instance, the programmable fabric die 94 may receive data from the channels 92 using a first clock (e.g., 1 GHz) in a first clock domain 140. However, the programmable fabric die 94 may pass data to the first protocol interpreter 130, the second protocol interpreter 132, and/or the PCIe logic circuitry 134 using a second clock (e.g., 500 MHz) in a second clock domain 142. Accordingly, the programmable fabric die 94 use clock-domain-crossing FIFOs 144 at a boundary 146 between the first clock domain 140 the second clock domain 142 to transfer data therebetween.

FIG. 6 is a timing diagram 160 showing a clock 162 used to transfer data over the channel 92. The timing diagram 160 also illustrates time slot line 164 indicating what that PCIe data is transferred across a respective channel 92. As illustrated, when the transceiver die 96 is used to implement a PCIe Gen4x16 interface, each cycle 166 of the clock 162 corresponds to a time slot 168. For instance, the time slots 168 may correspond to data being transferred over the channel 92A. As illustrated, each time slot 168 is used to transfer data over the IB 18 for a PCIe Gen4x16 interface. Therefore, the PCIe Gen4x16 interface utilizes a full bandwidth with no wasted potential bandwidth of the corresponding channel 92 by having null time slots.

Compared to a PCIe Gen4x16 interface, a down-configured PCIe interface (e.g., PCIe Gen4x1 or PCIe Gen4x1) may use considerably less bandwidth of one or more channels 92 (e.g., channels 92A and/or 92B). FIG. 7 illustrates a timing diagram 180 with a time slot line 181 relative to the clock 162. As illustrated, the down-configured PCIe interface utilizes only a portion of the bandwidth available in the channel 92. For instance, only a PCIe time slot 182 is used to transfer data during some cycles 166 of the clock 162. As illustrated, data is transferred once every four cycles 166 of the clock 162. Alternatively, data may be transferred periodically with any other period of cycles (e.g., once every sixteen cycles 166).

Figure 8:
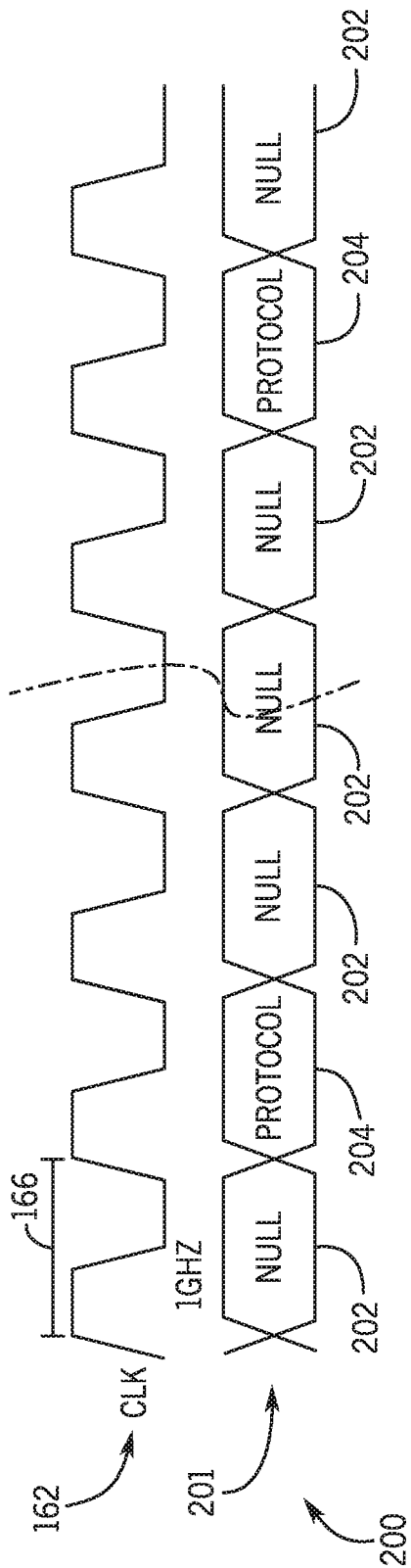
FIG. 8 is a timing diagram illustrating a partial utilization of bandwidth of the interface bridge of FIG. 1 using a second protocol, in accordance with an embodiment.

FIG. 8 illustrates a timing diagram 200 with a time slot line 201 illustrating a transfer of data (e.g., configuration data for the programmable fabric of the programmable fabric die 94 via another protocol (e.g., 10 Gbps Ethernet). As illustrated, the transfer of data may utilize only a portion of the bandwidth available for the channel(s) 92. For instance, the time slot line 201 includes null time slots 202 and protocol time slots 204. As illustrated, protocol data is transferred once every four cycles 166 of the clock 162. Alternatively, protocol data may be transferred periodically with any other period of cycles (e.g., once every sixteen cycles 166).

Figure 9:
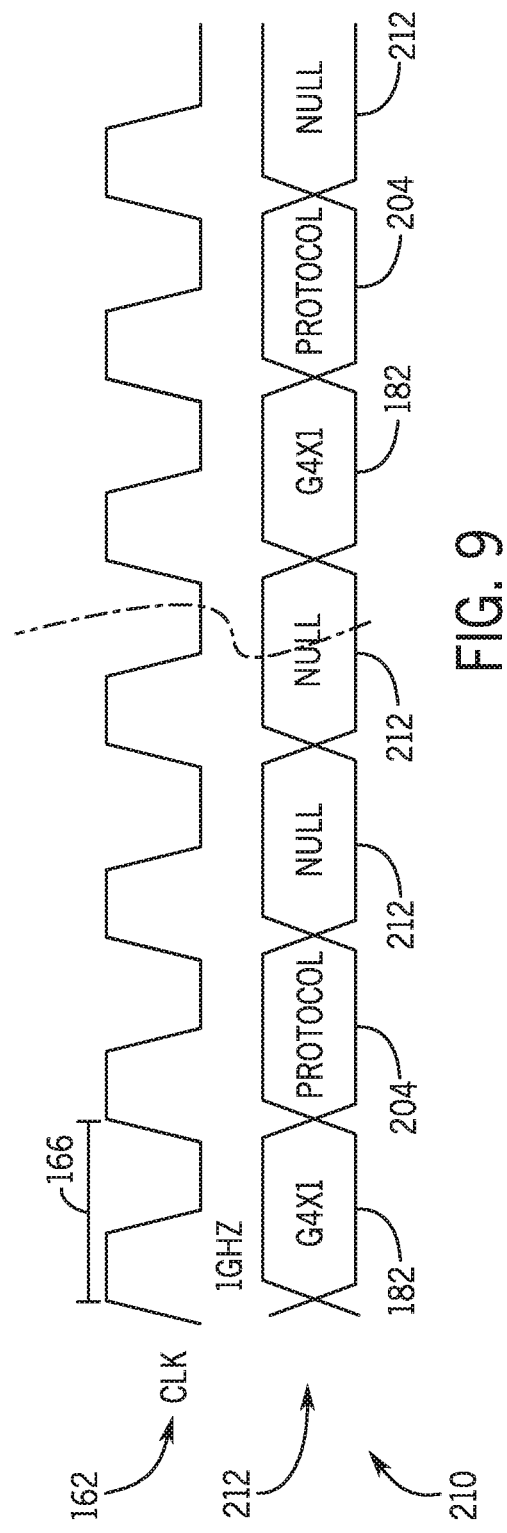
FIG. 9 is a timing diagram time-division multiplexing (TDM) the down-configured version of the first protocol of FIG. 7 and the second protocol of FIG. 8, in accordance with an embodiment.

In other words, two protocols would not consume an entire bandwidth of the channel(s) 92 over time. Indeed, these two protocols (e.g., PCIe and Ethernet or another protocol) may be mixed over one or more channels 92. By TDM the two protocols together may take advantage of timeslots containing null data by repurposing the null time slots with useful protocol data of another protocol (e.g., 10G Ethernet). FIG. 9 illustrates a TDM-based timing diagram 210 with the PCIe time slots 182 time-division multiplexed with protocol time slots 204 to enhance efficiency of use of the channel(s) 92 by the transceiver die 96.

The TDM scheme for the channel(s) 92 may be scalable. One higher bandwidth interface type may consume a number (e.g., 16) of channel(s) 92. If the interface type is down-configured to a lower bandwidth type. For instance, the higher bandwidth interface type may include PCIe Gen 4x16, and the down-configured bandwidth types may include PCIe Gen 4x1, PCIe Gen 4x4, or PCIe Gen 4x8. Absent the bypasses 104 (and related logic), the higher and lower bandwidth interface types may consume or block the same number of channels 92. For example, the PCIe Gen4x16 would have no extra available bandwidth (e.g., 0 Gbps out of 40 Gbps) available. PCIe Gen4x8 would have half (e.g., 20 Gbps out of 40 Gbps) available. PCIe Gen4x4 would have a ¾ (e.g., 30 Gbps out of 40 Gbps) available. PCIe Gen4x1 would have fifteen sixteenths (e.g., 37.5 Gbps out of 40 Gbps) available. Other protocols (e.g., Ethernet) may be time-division multiplexed with the PCIe data to consume any available time slots with different numbers of time slots being available according to the different down-configured types of interfaces used.

Additionally or alternatively, one or more of the channels 92 may be throttled at a lower frequency to match bandwidth usage to save dynamic power. For example, instead of a higher frequency (e.g., 1 GHz) for the channel(s) 92, a lower frequency (e.g., 312.5 MHz) would be sufficient to carry a single PCIe Gen4x1 time slot and four time slots of another protocol (e.g., Ethernet).

Furthermore, in some embodiments, a low-speed sideband signal may be used with a training pattern for deskew processes and timeslot allocation when the time-division multiplexed protocols share a common clock. The low-speed sideband signals may be used instead of valuable high-speed signals to indicate a repeated high-low data pattern for simple deskew word alignment. In addition to or alternative to the low-speed sideband signals, the high-speed signals may initialize round robin word ordering then convey data valid information for asynchronous overclocked scenarios when the two time-division multiplexed protocols do not have a common reference clock frequency.

Due to the nature of the programmability of the programmable fabric, the programmable fabric enables a flexibly locating the demultiplexers 136, tapping off of a TDM bus of the channel(s) 92, and spreading routing congestion issues. These benefits may not be present if using hardened circuitry (e.g., ASICs).

The foregoing discusses TDM of PCIe data and Ethernet. The same TDM concepts may be used to time-division multiplexed other protocols together. For instance, Precision Time Protocol (PTP) may be time-division multiplexed with another protocol (e.g., Ethernet). For example, Ethernet MAC with a clock (e.g., 400 MHz) may be over clocked at another frequency (e.g., 500 MHz) providing additional bandwidth (e.g., 20% more) to pass the PTP timestamps along with packets of payload data.

Figure 10:
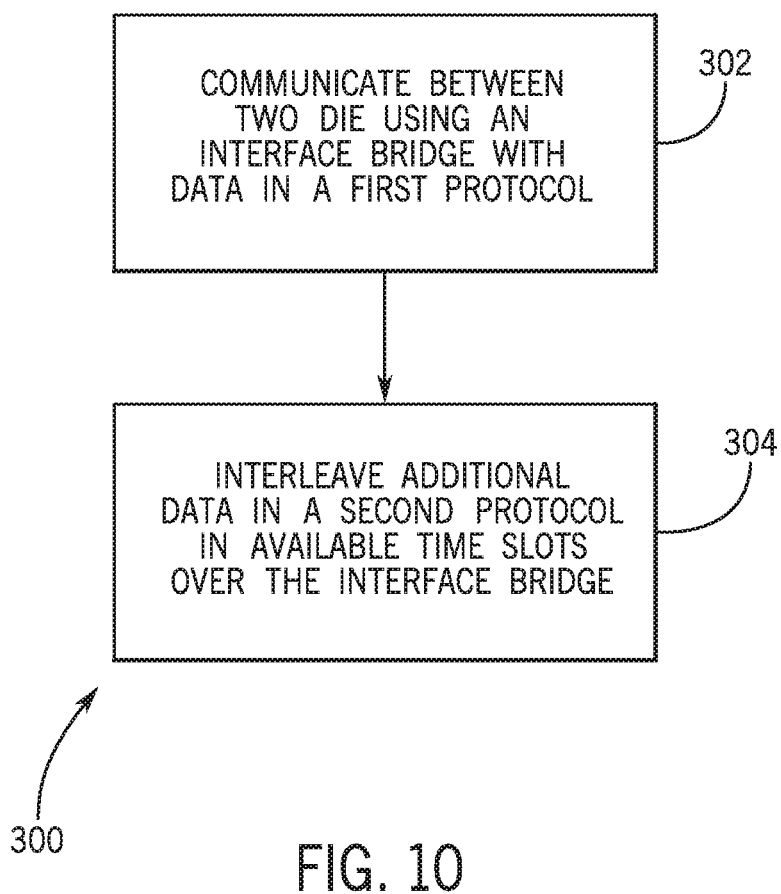
FIG. 10 is a flowchart of a method for using the interface bridge of FIG. 1, in accordance with an embodiment.

FIG. 10 is a flow diagram of a process 300 used to time-division multiplex two or more protocols across channels of an interconnect bridge between integrated circuit die. The process 300 includes communicating, using the IB 18, between a first die (e.g., transceiver die 96) and a second die (e.g., programmable fabric die 94) using a first protocol (e.g., PCIe Gen4x1) (block 302). The first protocol is a down-configured version (e.g., PCIe Gen4x1) of a high-bandwidth version (e.g., PCIe Gen4x16) passable through the IB 18. Multiplexers 106 then interleave additional data in a second protocol (e.g., Ethernet) over the IB (block 304). In some embodiments, the additional data is received at the first die using the second protocol before interleaving the additional data into communications between the first and second die using time-division multiplexing. The multiplexers 106 may select between the first protocol data and the second protocol data based on a control signal indicating beginning of time slots of transmission over the IB 18. The control signals cause the multiplexers 106 to select the first protocol data from the processing circuitry 100 or the second protocol data bypassing the processing circuitry 100.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A method comprising:
communicating, using an interconnect bridge, between a first die and a second die using a first protocol, wherein the first protocol is a down-configured version of a higher bandwidth version passable through the interconnect bridge, wherein the first protocol is configured to utilize a first clock frequency, wherein the first die comprises an interface comprising a plurality of channels each configured to selectively transmit data via a processing circuitry and to selectively bypass the processing circuitry for at least a portion of the data, wherein the processing circuitry is configured to selectively process data transmitted over each of the plurality of channels; and
interleaving data bypassing the processing circuitry over the interconnect bridge, wherein the data bypassing the processing circuitry is received at the first die using a second protocol before interleaving the data bypassing the processing circuitry into communications between the first and second die using time-division multiplexing, wherein interleaving the data bypassing the processing circuitry comprises:
sending the data using the first protocol at a second clock frequency to generate a time slot through which the data bypassing the processing circuitry is transmitted, wherein the second clock frequency is greater than the first clock frequency.

2. The method of claim 1, wherein the first die comprises a transceiver die and the second die comprises a programmable fabric die.

3. The method of claim 1, wherein the first protocol comprises a Peripheral Component Interconnect Express protocol.

4. The method of claim 3, wherein the down-configured version comprises a Peripheral Component Interconnect Express protocol generation four by one.

5. The method of claim 4, wherein the higher bandwidth version comprises a Peripheral Component Interconnect Express protocol generation four by sixteen.

6. The method of claim 1, wherein the second protocol comprises an Ethernet protocol.

7. The method of claim 1, wherein interleaving the data bypassing the processing circuitry comprises selecting between the data in the first protocol and the data bypassing the processing circuitry in the second protocol using a multiplexer.

8. The method of claim 7, wherein selecting between the data in the first protocol and the data bypassing the processing circuitry in the second protocol comprises receiving the data in the first protocol at the multiplexer from the processing circuitry that processes the data in the first protocol according to the first protocol.

9. The method of claim 8, wherein selecting between the data in the first protocol and the data bypassing the processing circuitry in the second protocol comprises receiving the data bypassing the processing circuitry at the multiplexer.

10. A system, comprising:
a first die, comprising:
processing circuitry configured to process first protocol data; and
a plurality of channels, wherein a respective channel of the plurality of channels is configured to selectively process data in the processing circuitry and to selectively bypass the processing circuitry, wherein the respective channel comprises:
a multiplexer that:
receives the first protocol data in a first protocol and second protocol data in a second protocol, wherein the first protocol data is received at a first clock frequency,
receives a control signal to time-division multiplex the first protocol data and the second protocol data together,
selects an output from the first protocol data and the second protocol data using an additional control signal, and
outputs the output over a corresponding channel of an interconnect bridge between the first die and a second die, wherein time slots for the output from the first protocol data and the second protocol data over the corresponding channel of the interconnect bridge are created by driving a clock frequency of the interconnect bridge to a frequency higher than the first clock frequency; and
a bypass that transmits the second protocol data to the multiplexer by bypassing the second protocol data by the processing circuitry.

11. The system of claim 10, wherein the first die comprises a transceiver die that receives data in the first and second protocols.

12. The system of claim 10, comprising the second die coupled to the first die via the interconnect bridge.

13. The system of claim 12, wherein the second die comprises a demultiplexer to receive the output from the interconnect bridge, to route the output to a first interpreter when the output is formatted in the first protocol, and to route the output to a second interpreter when the output is formatted in the second protocol.

14. The system of claim 12, wherein the second die comprises a plurality of demultiplexers each configured to receive outputs from a respective channel of the interconnect bridge and route data to corresponding interpreters, wherein the plurality of demultiplexers comprises a number of demultiplexers equal to a number of channels of the first die.

15. The system of claim 14, wherein the second die comprises a programmable fabric die having a programmable fabric, and the first protocol data or the second protocol data comprises configuration data for the programmable fabric.

16. The system of claim 10, wherein the first protocol comprises a low-bandwidth protocol that is a low-bandwidth version of a high-bandwidth protocol that consumes more resources of the interconnect bridge than the first protocol.

17. The system of claim 16, wherein the high-bandwidth protocol comprises Peripheral Component Interconnect Express protocol generation four by sixteen, and the low-bandwidth protocol comprises Peripheral Component Interconnect Express protocol generation four by one, Peripheral Component Interconnect Express protocol generation four by four, or Peripheral Component Interconnect Express protocol generation four by eight.

18. The system of claim 16, wherein the multiplexer injects the second protocol data into the corresponding channel of the interconnect bridge based at least in part on a difference in bandwidth between a maximum bandwidth of the high-bandwidth protocol and the low-bandwidth protocol.

19. A system comprising:
a transceiver die comprising an interface comprising a plurality of channels configured to transmit data via a processing circuitry or to bypass the processing circuitry for at least a portion of the data, wherein the processing circuitry is configured to selectively process data transmitted over each of the plurality of channels; and
a programmable fabric die coupled to the transceiver die, the programmable fabric die comprising:
a first protocol interpreter that interprets data in a first protocol;
a second protocol interpreter that interprets data in a second protocol;
a plurality of demultiplexers that receives data from the transceiver die via an interconnect bridge, wherein each of the plurality of demultiplexers is coupled to a respective channel of the interconnect bridge, wherein the data comprises:
a first portion comprising first protocol data formatted in the first protocol and transmitted over the interconnect bridge during a first time slot of a transmission of the data over the interconnect bridge, wherein the plurality of demultiplexers routes the first portion comprising the first protocol data to the first protocol interpreter; and a second portion comprising second protocol data formatted in the second protocol and transmitted over the interconnect bridge during a second time slot of the transmission, wherein the plurality of demultiplexers routes the second portion comprising the second protocol data to the second protocol interpreter, wherein the second time slot is created by driving a clock frequency of the interconnect bridge to a frequency higher than a frequency corresponding to the first protocol.

20. The system of claim 19, wherein the processing circuitry generates the first protocol data and wherein the transceiver die comprises:

a plurality of multiplexers that:

receive the first protocol data from the processing circuitry;

receive the second protocol data that bypasses the processing circuitry; and time-division multiplex the first protocol data with the second protocol data to bandwidth available due to a down-configuration of the first protocol that uses less than an entire bandwidth of the interconnect bridge.

21. The method of claim 1, wherein the second clock frequency comprises a clock frequency of the second protocol.

* * * * *